(12) United States Patent
Buck, Jr. et al.

(10) Patent No.: US 10,741,055 B2
(45) Date of Patent: Aug. 11, 2020

(54) SYSTEMS AND METHODS FOR HYBRID NON-EXCLUSION ZONE VIOLATING ROUTE DETERMINATION

(71) Applicant: BI Incorporated, Boulder, CO (US)

(72) Inventors: James J. Buck, Jr., Longmont, CO (US); Joseph P. Newell, Louisville, CO (US); Dustin Pettit, Boulder, CO (US); Mike Cooke, Boulder, CO (US)

(73) Assignee: BI Incorporated, Boulder, CO (US)

( * ) Notice: Subject to any disclaimer, the term of this patent is extended or adjusted under 35 U.S.C. 154(b) by 0 days.

(21) Appl. No.: 16/221,499

(22) Filed: Dec. 15, 2018

(65) Prior Publication Data
US 2019/0204099 A1 Jul. 4, 2019

Related U.S. Application Data

(60) Provisional application No. 62/612,650, filed on Jan. 1, 2018.

(51) Int. Cl.
| | | |
|---|---|---|
| *G08B 25/01* | (2006.01) | |
| *G08B 21/22* | (2006.01) | |
| *H04W 4/029* | (2018.01) | |
| *H04L 29/08* | (2006.01) | |
| *G06Q 50/26* | (2012.01) | |
| *G08B 21/24* | (2006.01) | |
| *G08B 25/10* | (2006.01) | |
| *G01C 21/34* | (2006.01) | |

(Continued)

(52) U.S. Cl.
CPC ....... *G08B 25/016* (2013.01); *G01C 21/3461* (2013.01); *G01S 5/0027* (2013.01); *G06F 1/3212* (2013.01); *G06F 1/3296* (2013.01); *G06Q 50/26* (2013.01); *G08B 21/0258* (2013.01); *G08B 21/0269* (2013.01); *G08B 21/0288* (2013.01); *G08B 21/182* (2013.01); *G08B 21/22* (2013.01); *G08B 21/24* (2013.01); *G08B 25/10* (2013.01); *H04L 67/22* (2013.01); *H04L 67/36* (2013.01); *H04W 4/021* (2013.01); *H04W 4/029* (2018.02); *H04W 52/028* (2013.01); *H04W 52/0277* (2013.01); *G01S 2205/002* (2013.01); *G01S 2205/008* (2013.01)

(58) Field of Classification Search
CPC .......... G01C 21/3461; G01S 2205/002; G01S 2205/008; G01S 5/0027; G06F 1/3212; G06F 1/3296; G06Q 50/26; G08B 21/0258; G08B 21/0269; G08B 21/0288; G08B 21/182; G08B 21/22; G08B 21/24; G08B 25/016; G08B 25/10; H04L 67/22; H04L 67/36; H04W 4/021; H04W 4/029; H04W 52/0277; H04W 52/028
See application file for complete search history.

(56) References Cited

U.S. PATENT DOCUMENTS

| | | |
|---|---|---|
| 4,724,427 A | 2/1988 | Carroll |
| 5,731,757 A | 3/1998 | Layson |

(Continued)

FOREIGN PATENT DOCUMENTS

| | | |
|---|---|---|
| WO | WO/1998/08204 | 2/1998 |
| WO | WO/2000/077688 | 12/2000 |

*Primary Examiner* — Quan-Zhen Wang
*Assistant Examiner* — Rajsheed O Black-Childress
(74) *Attorney, Agent, or Firm* — HDC IP Law, LLP

(57) ABSTRACT

Various embodiments provide systems and methods for aiding a monitored individual with monitoring compliance.

20 Claims, 10 Drawing Sheets

(51) Int. Cl.
 *G01S 5/00* (2006.01)
 *G06F 1/3212* (2019.01)
 *G06F 1/3296* (2019.01)
 *G08B 21/18* (2006.01)
 *H04W 52/02* (2009.01)
 *G08B 21/02* (2006.01)
 *H04W 4/021* (2018.01)

(56) References Cited

U.S. PATENT DOCUMENTS

| | | |
|---|---|---|
| 6,130,620 A | 10/2000 | Pinnow |
| 6,169,484 B1 | 1/2001 | Schuman |
| 6,323,773 B1 | 11/2001 | Runyon |
| 6,393,362 B1 | 5/2002 | Burns |
| 7,015,817 B2 | 3/2006 | Copley |
| 7,619,533 B2 | 11/2009 | Crucilla |
| 7,886,648 B2 | 2/2011 | Williams |
| 7,905,832 B1 | 3/2011 | Lau |
| 7,930,927 B2 | 4/2011 | Cooper |
| 8,352,111 B2 | 1/2013 | Mudalige |
| 8,493,219 B2 | 7/2013 | Buck |
| 8,576,065 B2 | 11/2013 | Buck et al. |
| 8,629,776 B2 | 1/2014 | Buck |
| 8,952,805 B2 | 2/2015 | Baines et al. |
| 9,240,118 B2 | 1/2016 | Melton |
| 9,355,548 B2 | 5/2016 | Buck |
| 9,423,487 B2 | 8/2016 | Buck |
| 9,629,420 B2 | 4/2017 | Cooper |
| 9,668,095 B1 | 5/2017 | Newell |
| 9,989,649 B2 | 6/2018 | Buck |
| 10,068,462 B2 | 9/2018 | Buck |
| 2003/0222781 A1 | 12/2003 | Defant et al. |
| 2005/0040944 A1 | 2/2005 | Contestabile |
| 2007/0014264 A1 | 1/2007 | Davis |
| 2007/0285258 A1 | 12/2007 | Hartman |
| 2008/0012760 A1 | 1/2008 | Derrick |
| 2008/0018459 A1 | 1/2008 | Derrick |
| 2011/0154887 A1 | 6/2011 | Cooper |
| 2011/0195722 A1 | 8/2011 | Walter et al. |
| 2011/0199205 A1 | 8/2011 | Kreml |
| 2011/0237726 A1 | 9/2011 | Dhuna |
| 2013/0328678 A1 | 12/2013 | Shechter et al. |
| 2014/0039804 A1 | 2/2014 | Park |
| 2014/0179342 A1 | 6/2014 | Hamerly |
| 2015/0123766 A1 | 5/2015 | St. John |
| 2015/0356261 A1 | 12/2015 | Brust |
| 2016/0154643 A1* | 6/2016 | Zhang .......... G01C 21/32 717/169 |
| 2016/0267770 A1 | 9/2016 | Keays |
| 2016/0301581 A1 | 10/2016 | Carter |
| 2017/0134249 A1 | 5/2017 | Laing |
| 2017/0224517 A1 | 8/2017 | Doyle et al. |
| 2017/0303090 A1 | 10/2017 | Stitt |
| 2017/0307388 A1* | 10/2017 | McConathy ....... G01C 21/3415 |
| 2019/0043285 A1 | 2/2019 | Hodge |

* cited by examiner

200
SYSTEMS AND METHODS FOR HYBRID NON-EXCLUSION ZONE VIOLATING ROUTE DETERMINATION

CROSS REFERENCE TO RELATED APPLICATION

The present application claims priority to (i.e., is a non-provisional of) U.S. Pat. App. No. 62/612,650 entitled "Systems and Methods for Monitoring Individuals", and filed Jan. 1, 2018 by Buck et al. The entirety of the aforementioned application is incorporated herein by reference for all purposes.

BACKGROUND OF THE INVENTION

Various embodiments provide systems and methods for aiding a monitored individual with monitoring compliance.

Large numbers of individuals are currently monitored as part of parole requirements or other requirements. Such monitoring allows a monitoring agency to determine whether the individual is engaging in acceptable patterns of behavior, and where an unacceptable behavior is identified to stop such behavior going forward.

Thus, there exists a need in the art for more advanced approaches, devices and systems for monitoring.

BRIEF SUMMARY OF THE INVENTION

Various embodiments provide systems and methods for aiding a monitored individual with monitoring compliance.

This summary provides only a general outline of some embodiments. Many other objects, features, advantages and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1A:
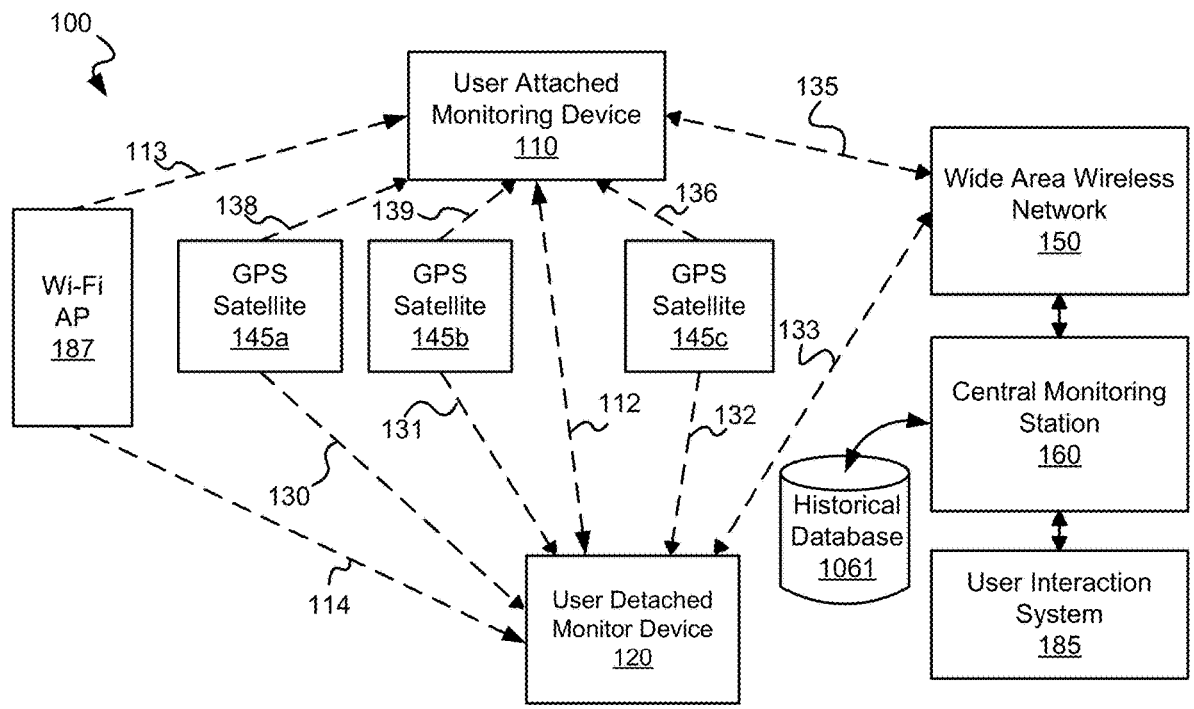
FIG. 1a is a block diagram illustrating a hybrid monitoring system including both a user attached monitor device and a user detached monitor device in accordance with various embodiments.

Various embodiments provide systems and methods for aiding a monitored individual with monitoring compliance.

It has been found that returning offenders to society after being locked up in a secure facility with little if any control of their day to day activities is often unsuccessful. It is often helpful to have, for example, a parole officer monitors their movements and activities for a period of time as they reenter society. In some cases, the parole officer is aided by a tracking device attached to the individual being monitored. However, this is costly as a parole officer must be significantly involved in monitoring and responding to situations. Some embodiments disclosed herein reduce the interaction between the tracking device and the parole officer.

Further, it has been found that once a monitoring term has been completed and a monitored individual has been fully released into society without oversight, the chances that the individual will re-engage in problematic behavior is high. Various embodiments disclosed herein provides tools and devices that continue to support the individual as they transition away from the active oversight by, for example, a parole officer.

Various embodiments provide monitoring systems that include a user detached monitor device. The user detached monitor device includes: a display, a local communication circuit operable to support communication via a local communication link with a user attached monitor device, a processor, and a computer readable medium. The computer readable medium includes instructions executable by the processor to: receive a request for routing between a beginning point and an ending point; receive exclusion zone data for the monitored individual; using the exclusion zone data, identify a route from the beginning point to the ending point that does not violate an exclusion zone; and display the identified route from the beginning point to the ending point that does not violate the exclusion zone. In some cases, the display may be a graphical display capable of, for example, displaying video, still images, graphics, and/or text. In various cases, the display is an audio display which may be, but is not limited to, a speaker capable of making sound. In one or more cases, the display is a combination of a graphical and audio display. In some cases, identifying the route from the beginning point to the ending point that does not violate an exclusion zone includes repeatedly accessing a third-party mapping service Internet site.

In some instances of the aforementioned embodiments where the computer readable medium is a first computer readable medium and the local communication circuit is a first local communication circuit, the systems further include the user attached monitor device. The user attached monitor device includes: a securing element operable to secure the user attached monitor device to a limb of the monitored individual, a second local communication circuit operable to support communication via the local communication link, and a second computer readable medium including at least one exclusion zone data. In some such instances, the instructions executable by the processor are further executable to request the exclusion zone data from the user attached monitor device via the local communication link. In other such instances where the processor is a first processor, the user attached monitor device includes a second processor and the second computer readable medium includes instructions executable by the second processor to request at least at least one exclusion zone data from a central monitoring station via a wireless wide area network. In some cases, the request for the exclusion zone data indicates an area of interest between the beginning point and the ending point.

In various instances of the aforementioned embodiments, identifying the route from the beginning point to the ending point that does not violate an exclusion zone includes requesting the route from a central monitoring station and receiving the route from the central monitoring station via a wireless wide area network. In some such instances identifying the route from the beginning point to the ending point that does not violate an exclusion zone includes repeatedly accessing a third-party mapping service Internet site.

Other embodiments provide methods for aiding a monitored individual that include: receiving a request for routing between a beginning point and an ending point, where the request is received via a user detached monitor device; receiving exclusion zone data for the monitored individual; using the exclusion zone data, identifying a route from the beginning point to the ending point that does not violate an exclusion zone; and displaying the identified route from the beginning point to the ending point that does not violate the exclusion zone via a display one the user detached monitor device.

In various instances of the aforementioned embodiments, the methods further include: requesting the exclusion zone data from a user attached monitor device via a local communication link between the user detached monitor device and the user attached monitor device, and wherein the user attached monitor device is secured to a limb of the monitored individual by a securing element. In some instances of the aforementioned embodiments, the methods further include requesting at least at least one exclusion zone data from a central monitoring station via a wireless wide area network. In one or more instances of the aforementioned embodiments, the request for the exclusion zone data indicates an area of interest between the beginning point and the ending point. In some instances of the aforementioned embodiments, identifying the route from the beginning point to the ending point that does not violate an exclusion zone includes requesting the route from a central monitoring station and receiving the route from the central monitoring station via a wireless wide area network. In some such instances, identifying the route from the beginning point to the ending point that does not violate an exclusion zone includes repeatedly accessing a third-party mapping service Internet site.

Turning to FIG. 1a, a block diagram illustrates a hybrid monitoring system 100 including both a user attached monitor device 110 and a user detached monitor device 120 in accordance with various embodiments. A local communication link 112 allows for communication between user attached monitor device 110 and user detached monitor device 120. Local communication link 112 may be any communication link that is capable of transferring information or otherwise communicating between two devices within a relatively short distance of each other. In some cases, for example, local communication link 112 may be a BlueTooth™ communication link. In other examples, local communication link 112 may be a line of sight infared communication link. As yet other examples, local communication link 112 may be a WiFi communication link. Based upon the disclosure provided herein, one of ordinary skill in the art will recognize a variety of communication protocols and/or media that may be used to implement local communication link 112.

User detached monitor device 120 is portable, and may be any device that is recognized as being used by or assigned to an individual being monitored, but is not physically attached to the individual being monitored by a tamper evident attaching device. User detached monitor device 120 may be, but is not limited to, a cellular telephone capable of communication with user attached monitor device 110 via local communication link 112. In contrast, user attached monitor device 110 is attached to the individual being monitored using a tamper evident attaching device like a strap. User attached monitor device 110 may be, but is not limited to, a tracking device that is attached around the limb of an individual and includes indicators to monitor whether the device has been removed from the individual or otherwise tampered. Hybrid monitoring system 100 further includes a central monitoring station 160 wirelessly coupled to user attached monitor device 110 and user detached monitor device 120 via one or more wireless wide area (e.g., cellular telephone network, Internet via a Wi-Fi access point, or the like) communication networks 150.

In some embodiments, central monitoring station 160 is communicably coupled to a historical database 1061. Central monitoring station 160 stores data received from one or both of user attached monitor device 110 and/or user detached monitor device 120. As such, historical database 1061 has a history of a monitored individual including violations, travel locations, and/or any other information about a monitored individual that is received via user attached monitor device 110 and/or user detached monitor device 120.

User detached monitor device 120 includes a location sensor that senses the location of the device and generates a location data. The location data may comprise one or more of: global positioning system ("GPS") data, Assisted GPS ("A-GPS") data, Advanced Forward Link Trilateration ("AFLT") data, and/or cell tower triangulation data. Where GPS is used, user detached monitor device 120 receives location information from three or more GPS satellites 145a, 145b, 145c via respective communication links 130, 131, 132. The aforementioned location data is utilized verify the location of a user associated with user detached monitor device 120 at various points as more fully discussed below. User detached monitor device 120 is considered "ambiguous" because it is not attached to the user in a tamper resistant/evident way, but rather is freely severable from the user and thus could be used by persons other than the target. Various processes discussed herein mitigate the aforementioned ambiguity to yield a reasonable belief that information derived from user detached monitor device 120 corresponds to the target.

The location data and/or other data gathered by user detached monitor device 120 is wirelessly transmitted to central monitoring station 160 via wide area wireless network 150 accessed via a wireless link 133. Central monitoring station 160 may be any location, device or system where the location data is received, including by way of non-limiting example: a cellular/smart phone, an email account, a website, a network database, and a memory device. The location data is stored by central monitoring station 160 and is retrievable therefrom by a monitor, such as a parent, guardian, parole officer, court liaison, spouse, friend, or other authorized group or individual. In this manner, monitor is able to respond appropriately to the detected out-of-bounds activity by a user. In some cases, the monitor is able to retrieve the location data via a user interaction system 185 which may be, but is not limited to, a network connected user interface device communicatively coupled via a network to central monitoring station 160 and/or directly to user detached monitor device 120 via wide area wireless network 150.

User detached monitor device 120 may further include a user identification sensor operable to generate user identification data for identifying the user in association with the generation of the location data. The user identification data may comprise one or more of: image data, video data, biometric data (e.g. fingerprint, DNA, retinal scan, etc. data), or any other type of data that may be used to verify the identity of the user at or near the time the location data is generated. And the user identification sensor may comprise one or more of: a camera, microphone, heat sensor, biometric data sensor, or any other type of device capable of sensing/generating the aforementioned types of user identification data.

The user identification data is wirelessly transmitted in association with the location data to central monitoring station 160 via a wireless transmitter communicatively coupled to the user identification sensor. The user identification data is stored in association with the location data by central monitoring station 160 and is retrievable therefrom by a monitor, such as a parent, guardian, parole officer, court liaison, spouse, friend, or other authorized group or individual. Preferably, the monitor is able to retrieve the location data via a network connected user interface device communicatively coupled—via the network—to central monitoring station 160 and/or to user detached monitor device 120. The location data may be transmitted to central monitoring station 160 independent of the user identification data, for example, during a periodic check-in with central monitoring system 160.

User detached monitor device 120 may further comprise a memory communicatively coupled to a control unit—which is also communicatively coupled to the location sensor, the identification sensor and the wireless transceiver—for controlling the operations thereof in accordance with the functionalities described herein. The memory may include non-transient instructions (e.g., software of firmware based instructions) executable by the control unit to perform and/or enable various functions associated with user detached monitor device 120. As user detached monitor device 120 is portable, each of the components may be located within, immediately adjacent to, or exposed without, a device housing whose dimensions are such that user detached monitor device 120 as a whole may be discretely carried by the user, for example, within a pocket or small purse. User detached monitor device 120 may include a Wi-Fi transceiver capable of receiving information from one or more Wi-Fi access points 187 that can be used to discern location via a Wi-Fi communication link 114.

Central monitoring station 160 preferably comprises a server supported website, which may be supported by a server system comprising one or more physical servers, each having a processor, a memory, an operating system, input/output interfaces, and network interfaces, all known in the art, coupled to the network. The server supported website comprises one or more interactive web portals through which the monitor may monitor the location of the user in accordance with the described embodiments. In particular, the interactive web portals may enable the monitor to retrieve the location and user identification data of one or more users, set or modify 'check-in' schedules, and/or set or modify preferences. The interactive web portals are accessible via a personal computing device, such as for example, a home computer, laptop, tablet, and/or smart phone.

In some embodiments, the server supported website comprises a mobile website accessible via a software application on a mobile device (e.g. smart phone). The mobile website may be a modified version of the server supported website with limited or additional capabilities suited for mobile location monitoring.

User attached monitor device 110 includes a location sensor that senses the location of the device and generates a location data. The location data may comprise one or more of: global positioning system ("GPS") data, Assisted GPS ("A-GPS") data, Advanced Forward Link Trilateration ("AFLT") data, and/or cell tower triangulation data. Where GPS is used, user attached monitor device 110 receives location information from three or more GPS satellites 145*a*, 145*b*, 145*c* via respective communication links 136, 138, 139. The aforementioned location data is utilized to verify the location of a user associated with user attached monitor device 110 at various points as more fully discussed below. User attached monitor device 110 is considered "non-ambiguous" because it is physically attached to the user in a tamper resistant way and as such provides information only about the user to which it is attached.

The location data and/or other data gathered by user attached monitor device 110 is wirelessly transmitted to central monitoring station 160 via a wide area wireless network 150 accessed via a wireless link 135. Central monitoring station 160 may be any location, device or system where the location data is received, including by way of non-limiting example: a cellular/smart phone, an email account, a website, a network database, and a memory device. The location data is stored by central monitoring station 160 and is retrievable therefrom by a monitor, such as a parent, guardian, parole officer, court liaison, spouse, friend, or other authorized group or individual. In this manner, monitor is able to respond appropriately to the detected out-of-bounds activity by a user.

User attached monitor device 110 may further comprise a memory communicatively coupled to a control unit—which is also communicatively coupled to the location sensor, the identification sensor and the wireless transceiver—for controlling the operations thereof in accordance with the functionalities described herein. The memory may include non-transient instructions (e.g., software of firmware based instructions) executable by the control unit to perform and/or enable various functions associated with user attached monitor device 110. User attached monitor device may include a strap which can be wrapped around a limb of the individual being monitored to secure user attached monitor device to the individual. The strap includes one or more tamper circuits and/or sensors that allow for a determination as to whether the device has been removed or otherwise tampered. Examples of a strap and tamper detection circuitry that may be used in relation to various embodiments discussed herein are described in U.S. Pat. No. 9,355,579 entitled "Methods for Image Based Tamper Detection", and filed by Buck et al. on Sep. 15, 2014; and US Pat. Pub. No. US 2017-0270778 A1 entitled "Systems and Methods for Improved Monitor Attachment", and filed by Melton et al. on Mar. 21, 2016. Both of the aforementioned references are incorporated herein by reference for all purposes. Based upon the disclosure provided herein, one of ordinary skill in the art will recognize a variety of straps, tamper circuits, tamper devices, and/or attachment and tamper detection approaches that may be used in relation to various embodiments. User attached monitor device 110 may include a Wi-Fi transceiver capable of receiving information from one or more Wi-Fi access points 187 that may be used to identify location via a Wi-Fi communication link 113.

Figure 1B:
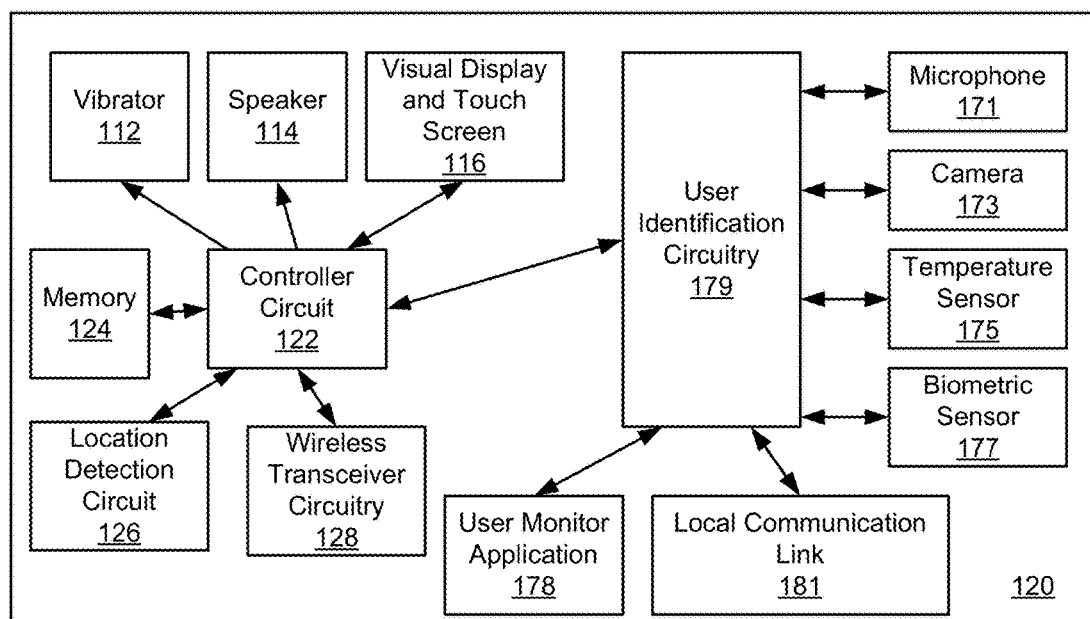
FIG. 1b is a block diagram of a user detached monitor device usable in accordance with one or more embodiments.

Turning to FIG. 1b, a block diagram of user detached monitor device 120 is shown in accordance with one or more embodiments. User detached monitor device 120 includes wireless transceiver circuitry 128 that is capable of sending and receiving information via wireless link 133 to/from wide area wireless network 150. Wireless transceiver circuitry 128 may be any circuitry, integrated circuit, and/or processor or controller capable of supporting wireless communication. Such wireless communication may include, but is not limited to, cellular telephone communication, Internet communication via a Wi-Fi access point, or both. In addition, user detached monitor device 120 includes a vibrator 112, a speaker 114, and a visual display and touch screen 116. In some cases, at scheduled times a user of user detached monitor device 120 is alerted of a need to check-in. The schedule of check-in times may be downloaded to a memory 124 by central monitoring station 160 via wireless link 133. The user may be alerted by one or more of: a visual prompt via visual display and touch screen 116, an audio prompt via speaker 114, and a tactile prompt via vibrator 112. Each of vibrator 112, speaker 114, and visual display and touch screen 116 is communicatively coupled to memory 124 and/or a control circuit 122 for controlling the operations thereof. In some cases, control circuit 122 includes a processor. In various cases, control circuit 122 is part of an integrated circuit. In one or more cases, memory 124 is included in an integrated circuit with control circuit 122. In various cases, memory 124 may include non-transient instructions (e.g., software of firmware based instructions) executable by controller circuit 122 to perform and/or enable various functions associated with user detached monitor device 120. A visual prompt may include, but is not limited to, text, images and/or a combination thereof, or a series of such visual prompts. An audio prompt may include, but is not limited to, one or more different audio prompts, or a series thereof. Each prompt may be stored in memory 124 and retrieved in accordance with the schedule that is also maintained in memory 124. In some embodiments, alerting the user involves a prompt that includes an e-mail or text message generated by central monitoring station 160 (e.g. the server supported website) and transmitted to the e-mail account or cellular phone number corresponding to user detached monitor device 120. In particular embodiments, such a prompt may include a 'post' on the user's 'wall,' 'feed,' or other social networking privilege. In some embodiments, the prompt may comprise an automated or live phone call to the user.

User detached monitor device 120 further includes user identification circuitry 179 capable of gathering user identification information from one or more of a microphone 171, a camera 173, a temperature sensor 175, and/or a biometric sensor 177. In some cases, user identification circuitry 179 is incorporated in an integrated circuit with control circuit 122. Microphone 171 is capable of accurately capturing the sound of a user's voice, camera 173 is capable of accurately capturing images including, for example, an image of the user's face, temperature sensor 175 is capable of accurately capturing an ambient temperature around user detached monitor device 120, and biometric sensor 177 is capable of accurately capturing biometric data about the user including, but not limited to, a thumb print, a retinal scan, or a breath-based alcohol measurement. Based upon the disclosure provided herein, one of ordinary skill in the art will recognize a variety of biometric data and corresponding sensors that may be used in relation to different embodiments. Under the direction of control circuitry 122, user identification circuitry 179 assembles one or more elements of data gathered by microphone 171, a camera 173, a temperature sensor 175, and/or a biometric sensor 177 into a user identification package which is forwarded to central monitoring station 160 via wireless transceiver circuitry 128.

User detached monitor device 120 additionally includes location circuitry 126. Location circuitry 126 may include one or more of, a GPS processing circuit capable of fixing a location of user detached monitor device 120 using GPS data, and/or a cell tower triangulation processing circuit capable of fixing a location of user detached monitor device 120 using cell tower triangulation data. A local communication link 181 controls communication between user detached monitor device 120 and user attached monitor device 110. In some embodiments, local communication link 181 supports a BlueTooth™ communication protocol and is capable of both receiving information from user attached monitor device 110 and transmitting information to user attached monitor device 110. In other embodiments, local communication link 181 supports a Wi-Fi communication protocol and is capable of both receiving information from user attached monitor device 110 and transmitting information to user attached monitor device 110. In some cases, local communication link 181 supports communication in only a receive or transmit direction. Based upon the disclosure provided herein, one of ordinary skill in the art will recognize a variety of communication protocols and information transfer directions that may be supported by local communication link 181 in accordance with different embodiments.

Figure 1C:
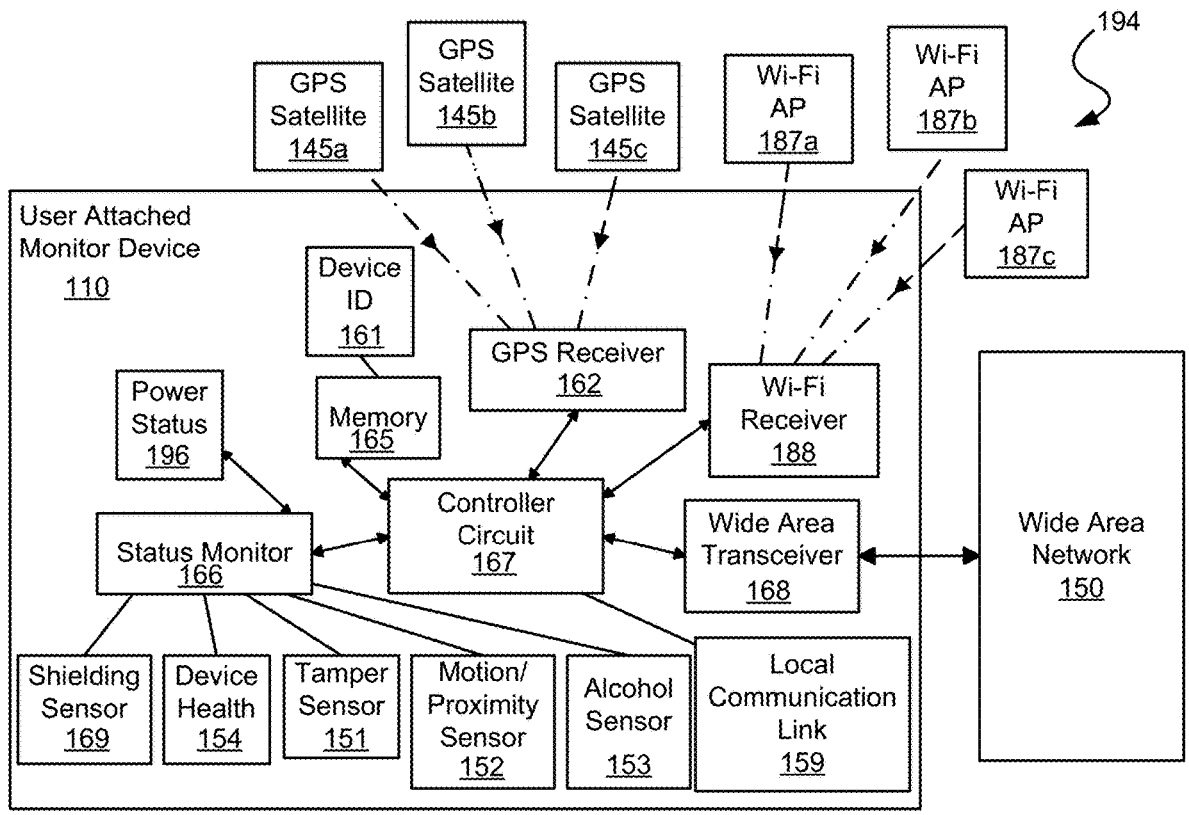
FIG. 1c is a block diagram of a user attached monitor device including a local communication link in accordance with some embodiments.

Turning to FIG. 1c, a block diagram 194 of user attached monitor device 110 including a local communication link 159 in accordance with some embodiments. Local communication link 159 controls communication between user attached monitor device 110 and user detached monitor device 120. In some embodiments, local communication link 159 supports a BlueTooth™ communication protocol and is capable of both receiving information from user detached monitor device 120 and transmitting information to user detached monitor device 120. In other embodiments, local communication link 159 supports a Wi-Fi communication protocol and is capable of both receiving information from user detached monitor device 110 and transmitting information to user detached monitor device 110. In some cases, local communication link 159 supports communication in only a receive or transmit direction. Based upon the disclosure provided herein, one of ordinary skill in the art will recognize a variety of communication protocols and information transfer directions that may be supported by local communication link 159 in accordance with different embodiments.

As shown, user attached monitor device 110 includes a device ID 161 that may be maintained in a memory 165, and thus is accessible by a controller circuit 167. Controller circuit 167 is able to interact with a GPS receiver 162 and memory 165 at times for storing and generating records of successively determined GPS locations. Similarly, controller circuit 167 is able to interact with a Wi-Fi receiver 188 and memory 165 at times for storing and generating records of successively determined Wi-Fi access point identifications and signal strength. In some cases, memory 165 may include non-transient instructions (e.g., software of firmware based instructions) executable by controller circuit 167 to perform and/or enable various functions associated with user attached monitor device 110. As user attached monitor device 110 comes within range of one or more Wi-Fi access points (e.g., Wi-Fi access points 187), Wi-Fi receiver 188 senses the signal provided by the respective Wi-Fi access points, and provides an identification of the respective Wi-Fi access point and a signal strength of the signal received from the Wi-Fi access point to Wi-Fi receiver 188. This information is provided to controller circuit 167 which stores the information to memory 165.

Where user attached monitor device 110 is operating in a standard mode, controller circuit 167 causes an update and reporting of the location of user attached monitor device 110 via a cellular transceiver 168 and a wide area communication network 150 in accordance with a first time period. In contrast, where user attached monitor device 110 is within range of a public Wi-Fi access point, reporting the location of user attached monitor device 110 may be done via the public Wi-Fi access point in place of the cellular communication link. In another case where user attached monitor device 110 is operating in a low battery mode, reporting the location of user attached monitor device 110 may be done via user detached monitoring device 120 coupled using local communication link 159.

Which technologies are used to update the location of user attached monitor device 110 may be selected either by default, by programming from a central monitor system (not shown), or based upon scenarios. For example, it may be determined whether sufficient battery power as reported by power status 196 remains in user attached monitor device 110 to support a particular position determination technology. Where insufficient power remains, the particular technology is disabled. In some cases, a maximum cost of resolving location may be set for user attached monitor device 110. For example, resolving Wi-Fi location data may incur a per transaction cost to have a third-party service provider resolve the location information. When a maximum number of resolution requests have been issued, the Wi-Fi position determination technology may be disabled. Further, it may be determined the likelihood that a particular position determination technology will be capable of providing meaningful location information. For example, where user attached monitor device 110 is moved indoors, GPS receiver 162 may be disabled to save power. Alternatively, where the tracking device is traveling at relatively high speeds, the Wi-Fi receiver 188 may be disabled. As yet another example, where cellular phone jamming is occurring, support for cell tower triangulation position determination may be disabled. As yet another example, where GPS jamming is occurring, GPS receiver 162 may be disabled. As yet another example, where user attached monitor device 110 is stationary, the lowest cost (from both a monetary and power standpoint) tracking may be enabled while all other technologies are disabled. Which position determination technologies are used may be based upon which zone a tracking device is located. Some zones may be rich in Wi-Fi access points and in such zones Wi-Fi technology may be used. Otherwise, another technology such as cell tower triangulation or GPS may be used.

Controller circuit 167 of user attached monitor device 110 at times functions in conjunction with cellular transceiver 168 to send and receive data and signals through wide area communication network 150. This link at times is useful for passing information and/or control signals between a central monitoring system (not shown) and user attached monitor device 110. The information transmitted may include, but is not limited to, location information, alcohol information, and information about the status of user attached monitor device 110. Based on the disclosure provided herein, one of ordinary skill in the art will recognize a variety of information that may be transferred via wide area communication network 150.

Various embodiments of user attached monitor device 110 include a variety of sensors capable of determining the status of user detached monitor device 120, and of the individual associated therewith. For example, a status monitor 166 may include one or more of the following subcomponents: power status sensor 196 capable of indicating a power status of user detached monitor device 120. The power status may be expressed, for example as a percentage of battery life remaining. Based upon the disclosure provided herein, one of ordinary skill in the art will recognize a variety of forms in which power status may be expressed. In addition, user attached monitor device 110 includes a set of shielding sensors 169 that are capable of determining whether user attached monitor device 110 is being shielded from receiving GPS signals and/or if GPS jamming is ongoing, a set of device health indicators 154, a tamper sensor 131 capable of determining whether unauthorized access to user attached monitor device 110 has occurred or whether user attached monitor device 110 has been removed from an associated individual being monitored, a motion/proximity sensor 152 capable of determining whether user attached monitor device 110 is moving and/or whether it is within proximity of an individual associated with user detached monitor device 120, and/or an alcohol sensor 153. Such an alcohol sensor may be any alcohol sensor capable of estimating an amount of alcohol in the individual being monitored. Based upon the disclosure provided herein, one of ordinary skill in the art will recognize a variety of alcohol sensors and corresponding alcohol sensing circuitry that may be used in relation to different embodiments. Based on the disclosure provided herein, one of ordinary skill in the art will recognize a variety of shielding sensors, a variety of device health transducers and indicators, a variety of tamper sensors, various different types of motion sensors, different proximity to human sensors, and various human body physical measurement sensors or transducers that may be incorporated into user attached monitor device 110 according to various different instances and/or embodiments.

Figure 1D:
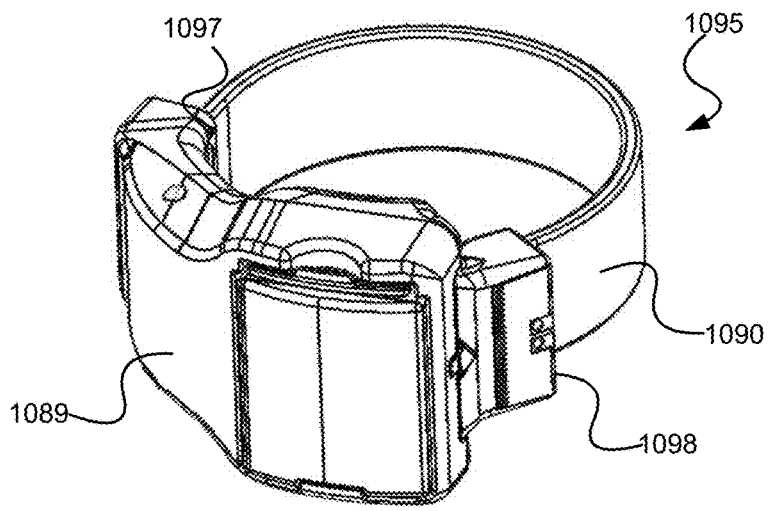
FIG. 1d shows a user attached monitor device with an attachment element for attaching the user attached monitor device to a limb of an individual in accordance with some embodiments.

Turning to FIG. 1d, a user attached monitor device 1089 is shown with an example attachment element 1090 connected at opposite ends of user attached monitor device 1089 (i.e., a first end 1097 and a second end 1098). Attachment element 1090 is operable to securely attach a tracking device 1095 (i.e., a combination of user attached monitor device 1089 and attachment element 1090) to a limb of an individual in accordance with some embodiments. In various embodiments, attachment element 1090 includes electrically and/or optically conductive material used to make a conductive connection form first end 1097 to second end 1098 through attachment element 1090 and is used in relation to determining whether user attached monitor device 1089 remains attached and/or has been tampered with. While FIG. 1*d* shows a strap as an example attachment element, based upon the disclosure provided herein, one of ordinary skill in the art will recognize other types of attachment elements that may be used in relation to different embodiments.

Figure 2:
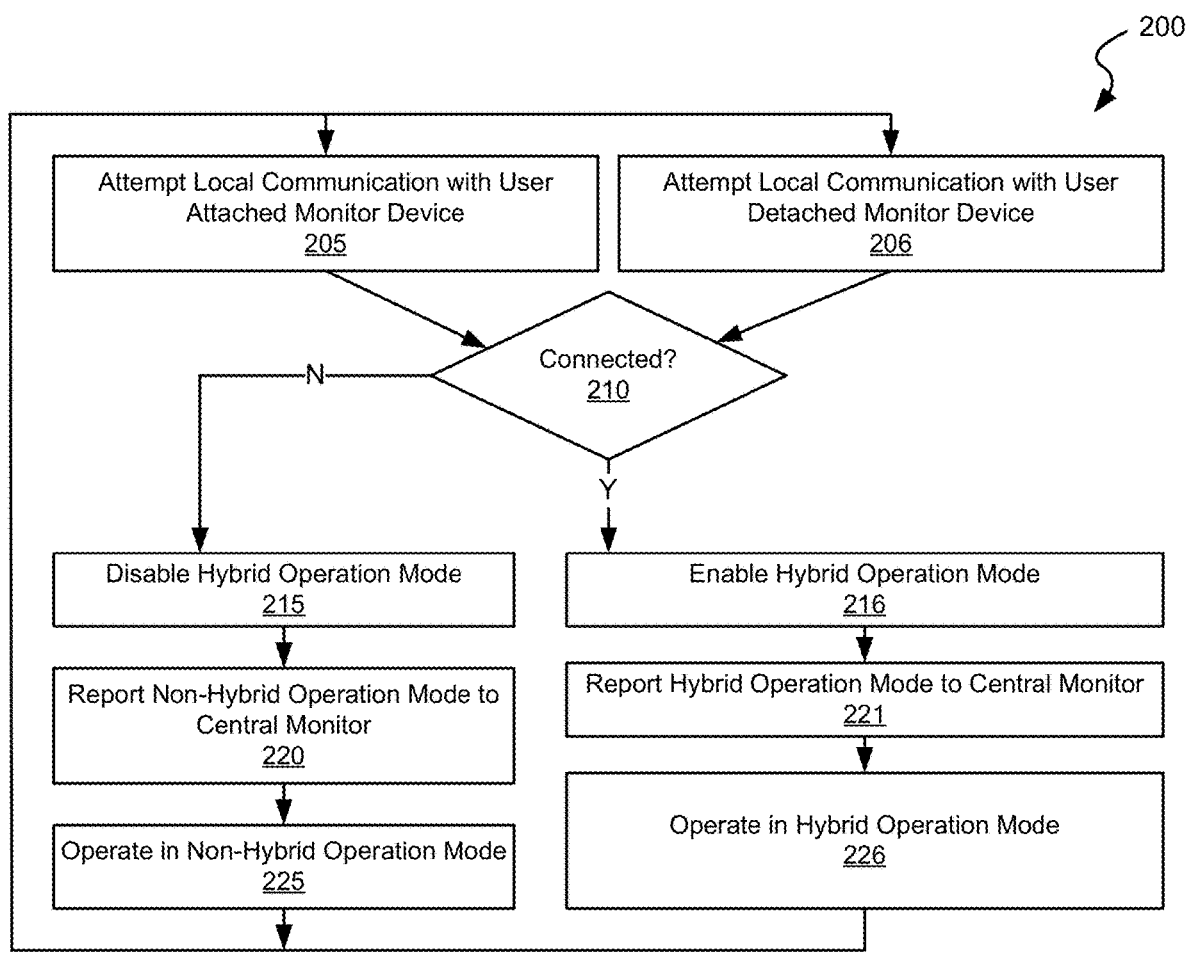
FIG. 2 is a flow diagram showing a method for connecting a user detached monitoring device and a user attached monitoring device using a local communication link, and for changing a mode of operation of a monitoring system based upon the connection in accordance with various embodiments.

Turning to FIG. 2, a flow diagram 200 shows a method for connecting a user detached monitoring device and a user attached monitoring device using a local communication link, and for changing a mode of operation of a monitoring system based upon the connection in accordance with various embodiments. The mode of operation is changed between a non-hybrid operation mode where monitoring is performed exclusively by only one of the user detached monitor device or the user attached monitor device. In certain embodiments, when a connection between a user attached monitor device and a user detached monitor device is not possible, monitoring of an individual is performed exclusively by the user attached monitor device.

Following flow diagram 200, local communication is attempted by the user detached monitor device to the user attached monitor device (block 205). The communication attempt can be sent by one or both of the user attached monitoring device and/or the user detached monitoring device. In some cases, the communication is always attempted by the user detached monitor device to the user attached monitor device (block 205). In such cases, the aforementioned local communication link 181 of the user detached monitor device is used to send a connection request to local communication link 159 of the user attached monitor device. Where the request is accepted by the user attached monitor device, the devices are connected. In some cases, the connection request is a BlueTooth™ communication protocol request. In other cases, the connection request is a Wi-Fi communication protocol request. Based upon the disclosure provided herein, one of ordinary skill in the art will recognize a variety of communication protocol requests that may be used in relation to different embodiments.

In other cases, the communication is always attempted by the user attached monitoring device to the user detached monitor device (block 206). In such cases, the aforementioned local communication link 159 of the user attached monitor device is used to send a connection request to the local communication link 181 of the user detached monitor device. Where the request is accepted by the user detached monitor device, the devices are connected. In certain cases, the communication is attempted by both the user attached monitoring device to the user detached monitor device, and the user detached monitoring device to the user attached monitor device in parallel (block 206). Where either the connection request from the user detached monitor device to the user attached monitor device or the connection request from the user attached monitor device to the user detached monitor device is accepted by the recipient device, the user attached monitor device and the user detached monitor device are considered connected (block 210).

Where the user detached monitor device and the user attached monitor device are considered attached (block 210), hybrid mode operation is enabled (block 216) and the hybrid mode of operation is reported to the central monitor by one or both of the user detached monitor device and/or the user attached monitor device (block 221). Hybrid mode operation allows for use of functionality from a combination of the user attached monitor device and the user detached monitor device (block 226). Such operation in the hybrid mode is shown in dashed lines as there are a large number of combinations of the functionality of the user detached monitor device and the user attached monitor device that may be used in relation to different embodiments. For example, as discussed in more detail below in relation to FIG. 3, where it is determined that the battery in the user attached monitor device is identified the cellular transmitter in the user attached monitor device may be shut down and all cellular communications handled via the user detached monitor device. This may be done, for example, by transferring reporting data from the user attached monitor device to the user detached monitor device (using a combination of local communication link 159 and local communication link 181), and the information transferred to the user detached monitor device is uploaded to a central monitor using the cellular transceiver of the user detached monitor device. Based upon the disclosure provided herein, one of ordinary skill in the art will recognize a variety of combinations of the functionality of the user detached monitor device and the user attached monitor device that may be used in relation to different embodiments.

Alternatively, where the user detached monitor device and the user attached monitor device are not considered attached (block 210), the hybrid mode of operation is disabled (block 215) and the non-hybrid mode of operation is reported to the central monitor by one or the other of the user detached monitor device or the user attached monitor device that attempted to connect to the other but failed to establish a connection (block 220). Non-hybrid mode operation causes both the user attached monitor device and the user detached monitor device to operate as if they are the only monitoring device in operation (block 225).

Figure 3:
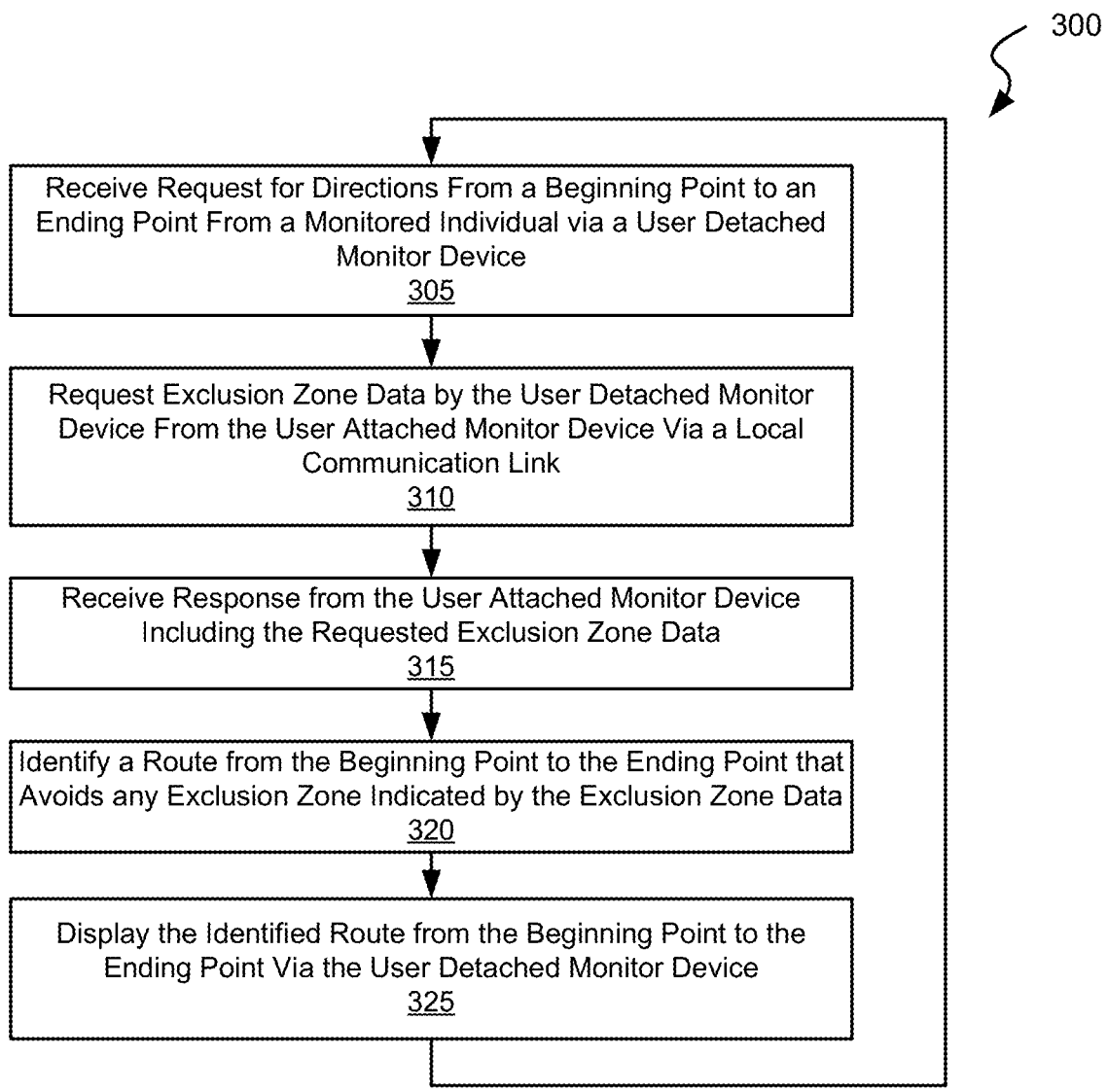
FIG. 3 is a flow diagram showing a method in accordance with some embodiments for providing direction at a monitored individual that are consistent with monitoring system constraints.

Turning to FIG. 3, a flow diagram 300 shows a method in accordance with some embodiments for providing direction at a monitored individual that are consistent with monitoring system constraints. Following flow diagram 300, a request is received via a user detached monitor device (block 305). The request is for directions and includes a beginning point and an ending or destination point from a monitored individual associated with the user detached monitor device. As one example, a monitored individual may intend to go to their place of work. In such a case, the monitored individual may indicate that the ending point is the location of the work. The beginning point may either be the location where the monitored individual is at that point which can in some cases be automatically generated using, for example, location detection circuit 126 discussed above in relation to FIG. 1*b* or may be a location provided to the user detached monitor device by the monitored individual using, for example, visual display and touch screen 116 discussed above in relation to FIG. 1*b*. Based upon the disclosure provided herein, one of ordinary skill in the art will recognize a variety of mechanisms and/or approaches that may be used to provide the aforementioned beginning point and ending point to the user detached monitor device.

The user detached monitor device communicates with the user attached monitor device via a local communication link to request exclusion zone data (block 310). As used herein, an "exclusion zone" is any area or location where an individual associated with the user detached monitor device and/or the user attached monitor device is prohibited and/or discouraged from entering. The exclusion zones may be identified in a number of ways. For example, the exclusion zones may be identified as two opposing corners of a rectangle or a center point and radius of a circle. Based upon the disclosure provided herein, one of ordinary skill in the recognize other approaches that may be used for identifying the boundaries of an exclusion zone. The universe of exclusion zones may be developed, for example, by local area officials to identify the location of different types of zones in a region that they operate. In turn, zone information from a number of local regions may be assembled in a common database to make a wider area map of zones. Exclusion zones may each be identified for different reasons, and may be grouped together with other exclusion zones that share similar characteristics. For example, places where children are present like parks and schools, places where alcohol is prevalent such as bars or night clubs, or the like. Individuals may be precluded from entering one or more types of exclusion zones.

The user attached monitor device is physically connected to the monitored individual. This may include a request to upload exclusion zone data for areas a defined width along a direct line from the beginning point to the ending point. The defined width is selected to encompass sufficient area on each side of the direct line to allow for adjustment of routes to avoid entering one or more exclusion zones existing along a route between the beginning point and the ending point. The request for the exclusion zone data may include four coordinates indicating a rectangular region extending a defined width from either side of a direct line from the beginning point to the ending point. The requested exclusion zone data may include coordinates outlining a perimeter for each of the exclusion zones at least partially in the region. Based upon the disclosure provide herein, one of ordinary skill in the art will recognize a variety of approaches and/or mechanisms that may be used to request and receive exclusion zone data from the user attached monitor device.

The requested exclusion zone data is transferred from the user attached monitor device to the user detached monitor device via the local communication link (block 315). This exclusion zone data including coordinates indicating the perimeter of each of the exclusion zones at least partially within the region is received by the user detached monitor device. The user detached monitor device then identifies a route that extends from the beginning point to the ending point without extending into any exclusion zone between the beginning point and the ending point (block 320). One example of a route identification approach that may be used in relation to different embodiments is set forth below in relation to FIGS. 8a-8b. That said, any route identification approach may be used in relation to different embodiments that is capable of identifying a route between the beginning point and the ending point that does not traverse any exclusion zone.

Once the route is identified (block 320), the identified route is displayed by the user detached monitor device (block 325). This may be done, for example, by graphically displaying the route on a map using visual display and touch screen 116. Alternatively, or in addition, displaying the route via the user detached monitor device may be done by displaying textual instructions defining the route via visual display and touch screen 116. Based upon the disclosure provided herein, one of ordinary skill in the art will recognize a variety of approaches for communicating the identified route to the monitored individual via the user detached monitor device.

Figure 4:
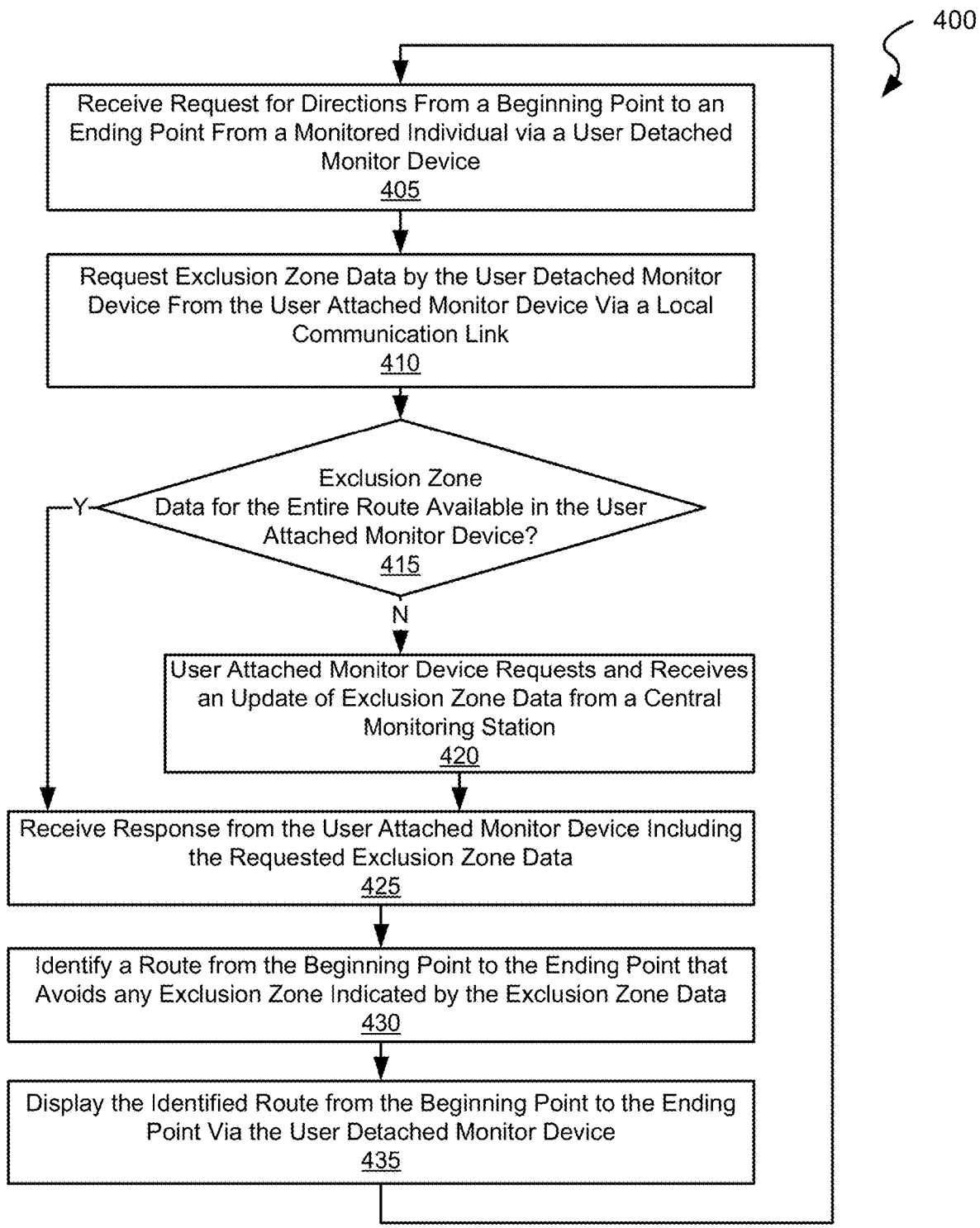
FIG. 4 is a flow diagram showing another method in accordance with other embodiments for providing direction at a monitored individual that are consistent with monitoring system constraints.

Turning to FIG. 4, a flow diagram 400 shows another method in accordance with other embodiments for providing direction at a monitored individual that are consistent with monitoring system constraints. Following flow diagram 400, a request is received via a user detached monitor device (block 405). The request is for directions and includes a beginning point and an ending or destination point from a monitored individual associated with the user detached monitor device. As one example, a monitored individual may intend to go to their place of work. In such a case, the monitored individual may indicate that the ending point is the location of the work. The beginning point may either be the location where the monitored individual is at that point which can in some cases be automatically generated using, for example, location detection circuit 126 discussed above in relation to FIG. 1b or may be a location provided to the user detached monitor device by the monitored individual using, for example, visual display and touch screen 116 discussed above in relation to FIG. 1b. Based upon the disclosure provided herein, one of ordinary skill in the art will recognize a variety of mechanisms and/or approaches that may be used to provide the aforementioned beginning point and ending point to the user detached monitor device.

The user detached monitor device communicates with the user attached monitor device via a local communication link to request exclusion zone data (block 410). Again, the user attached monitor device is physically connected to the monitored individual. This may include a request to upload exclusion zone data for areas a defined width along a direct line from the beginning point to the ending point. The defined width is selected to encompass sufficient area on each side of the direct line to allow for adjustment of routes to avoid entering one or more exclusion zones existing along a route between the beginning point and the ending point. The request for the exclusion zone data may include four coordinates indicating a rectangular region extending a defined width from either side of a direct line from the beginning point to the ending point. The requested exclusion zone data may include coordinates outlining a perimeter for each of the exclusion zones at least partially in the region. Based upon the disclosure provide herein, one of ordinary skill in the art will recognize a variety of approaches and/or mechanisms that may be used to request and receive exclusion zone data from the user attached monitor device.

As the user attached monitor device may only include a subset of the overall exclusion zone data at any given time, it is determined whether the requested exclusion zone data is available from the user attached monitor device (block 415). This is done by the user attached monitor device based upon the region of exclusion zone data requested by the user detached monitor device. Where anything less than all of the requested exclusion zone data is currently available from the user attached monitor device (block 415), the user attached monitor device requests any missing exclusion zone data corresponding to the request received from the user detached monitor device (block 420). This request for any missing exclusion zone data is made to a central monitoring station via a wireless wide area network. Once the request is received from the user attached monitor device, the requested exclusion zone data is transferred to the user attached monitor device via the wireless wide area network.

Either using exclusion zone data already stored in the user attached monitor device or using exclusion zone data recently provided to the user attached monitor device, the user attached monitor device provides the requested exclusion zone data to the user detached monitor device via the local communication link (block 425). This exclusion zone data including coordinates indicating the perimeter of each of the exclusion zones at least partially within the region is received by the user detached monitor device. The user detached monitor device then identifies a route that extends from the beginning point to the ending point without extending into any exclusion zone between the beginning point and the ending point (block 430). One example of a route identification approach that may be used in relation to different embodiments is set forth below in relation to FIGS. 8a-8b. That said, any route identification approach may be used in relation to different embodiments that is capable of identifying a route between the beginning point and the ending point that does not traverse any exclusion zone.

Once the route is identified (block 430), the identified route is displayed by the user detached monitor device (block 435). This may be done, for example, by graphically displaying the route on a map using visual display and touch screen 116. Alternatively, or in addition, displaying the route via the user detached monitor device may be done by displaying textual instructions defining the route via visual display and touch screen 116. Based upon the disclosure provided herein, one of ordinary skill in the art will recognize a variety of approaches for communicating the identified route to the monitored individual via the user detached monitor device.

Figure 5:
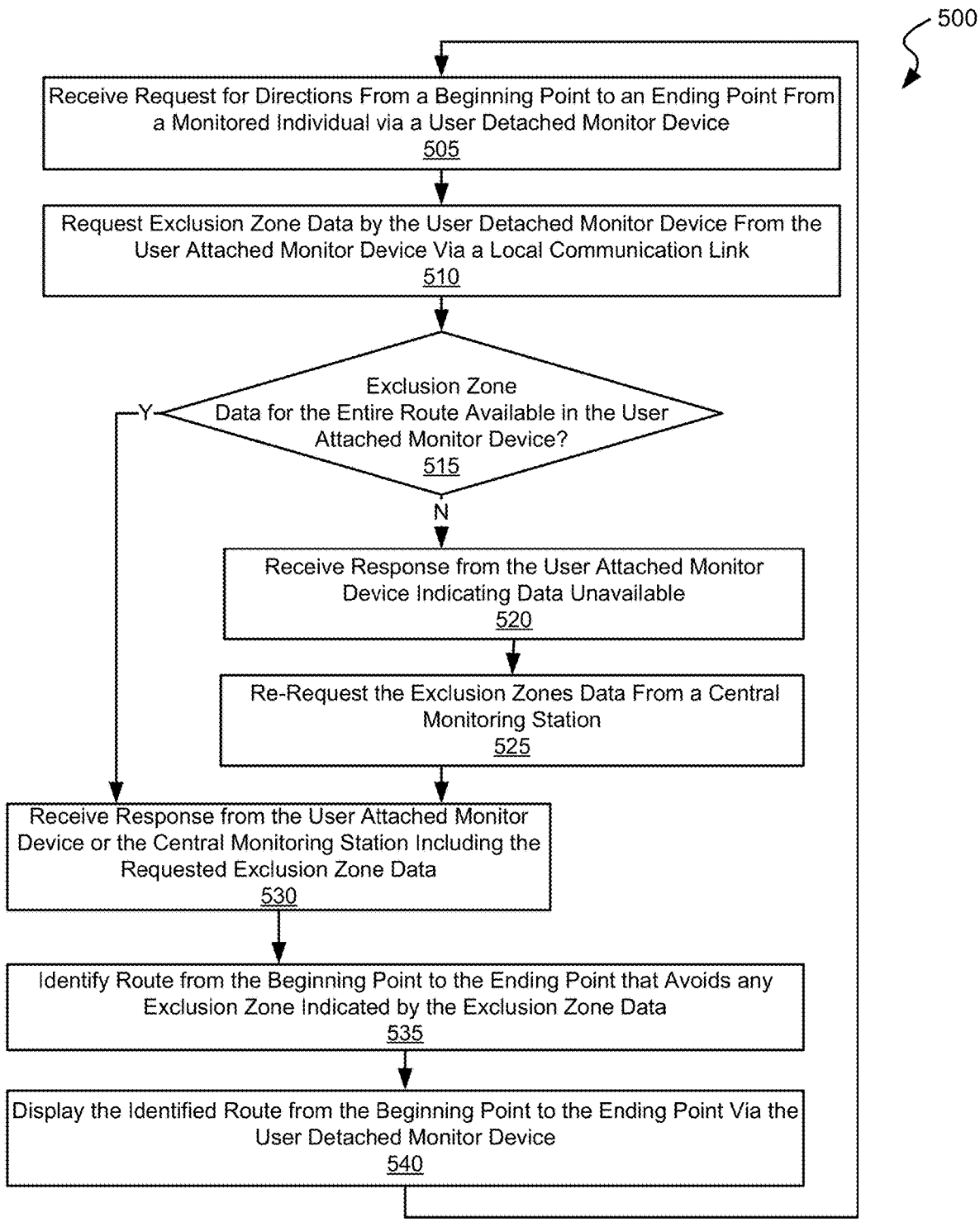
FIG. 5 is a flow diagram showing yet another method in accordance with yet other embodiments for providing direction at a monitored individual that are consistent with monitoring system constraints

Turning to FIG. 5, a flow diagram 500 shows yet another method in accordance with yet other embodiments for providing direction at a monitored individual that are consistent with monitoring system constraints. Following flow diagram 500, a request is received via a user detached monitor device (block 505). The request is for directions and includes a beginning point and an ending or destination point from a monitored individual associated with the user detached monitor device. As one example, a monitored individual may intend to go to their place of work. In such a case, the monitored individual may indicate that the ending point is the location of the work. The beginning point may either be the location where the monitored individual is at that point which can in some cases be automatically generated using, for example, location detection circuit 126 discussed above in relation to FIG. 1b or may be a location provided to the user detached monitor device by the monitored individual using, for example, visual display and touch screen 116 discussed above in relation to FIG. 1b. Based upon the disclosure provided herein, one of ordinary skill in the art will recognize a variety of mechanisms and/or approaches that may be used to provide the aforementioned beginning point and ending point to the user detached monitor device.

The user detached monitor device communicates with the user attached monitor device via a local communication link to request exclusion zone data (block 510). Again, the user attached monitor device is physically connected to the monitored individual. This may include a request to upload exclusion zone data for areas a defined width along a direct line from the beginning point to the ending point. The defined width is selected to encompass sufficient area on each side of the direct line to allow for adjustment of routes to avoid entering one or more exclusion zones existing along a route between the beginning point and the ending point. The request for the exclusion zone data may include four coordinates indicating a rectangular region extending a defined width from either side of a direct line from the beginning point to the ending point. The requested exclusion zone data may include coordinates outlining a perimeter for each of the exclusion zones at least partially in the region. Based upon the disclosure provide herein, one of ordinary skill in the art will recognize a variety of approaches and/or mechanisms that may be used to request and receive exclusion zone data from the user attached monitor device.

As the user attached monitor device may only include a subset of the overall exclusion zone data at any given time, it is determined whether the requested exclusion zone data is available from the user attached monitor device (block 515). This is done by the user attached monitor device based upon the region of exclusion zone data requested by the user detached monitor device. Where anything less than all of the requested exclusion zone data is currently available from the user attached monitor device (block 515), the user attached monitor device responds to the user detached monitor device indicating that all of the requested exclusion zone data is not available (block 520).

Based upon this inability to obtain the exclusion zone data from the user attached monitor device (block 520), the user detached monitor device re-requests the exclusion zone data from a central monitoring station via a wireless wide area network (block 525). The request provided from the user detached monitor device to the central monitoring station for exclusion zone data may be similar or even identical to the earlier request for the data directed to the user attached monitor device. As the central monitoring station holds all of the exclusion zone data, the request should be fulfilled.

Exclusion zone data is received from either the user attached monitor device or the central monitoring station (block 530). This exclusion zone data including coordinates indicating the perimeter of each of the exclusion zones at least partially within the region is received by the user detached monitor device. The user detached monitor device then identifies a route that extends from the beginning point to the ending point without extending into any exclusion zone between the beginning point and the ending point (block 430). One example of a route identification approach that may be used in relation to different embodiments is set forth below in relation to FIGS. 8a-8b. That said, any route identification approach may be used in relation to different embodiments that is capable of identifying a route between the beginning point and the ending point that does not traverse any exclusion zone.

Either using exclusion zone data received from the user attached monitor device or exclusion zone data received from the central monitoring station (block 530), the user detached monitor device identifies a route that extends from the beginning point to the ending point without extending into any exclusion zone between the beginning point and the ending point (block 535). One example of a route identification approach that may be used in relation to different embodiments is set forth below in relation to FIGS. 8a-8b. That said, any route identification approach may be used in relation to different embodiments that is capable of identifying a route between the beginning point and the ending point that does not traverse any exclusion zone.

Once the route is identified (block 535), the identified route is displayed by the user detached monitor device (block 540). This may be done, for example, by graphically displaying the route on a map using visual display and touch screen 116. Alternatively, or in addition, displaying the route via the user detached monitor device may be done by displaying textual instructions defining the route via visual display and touch screen 116. Based upon the disclosure provided herein, one of ordinary skill in the art will recognize a variety of approaches for communicating the identified route to the monitored individual via the user detached monitor device.

Figure 6:
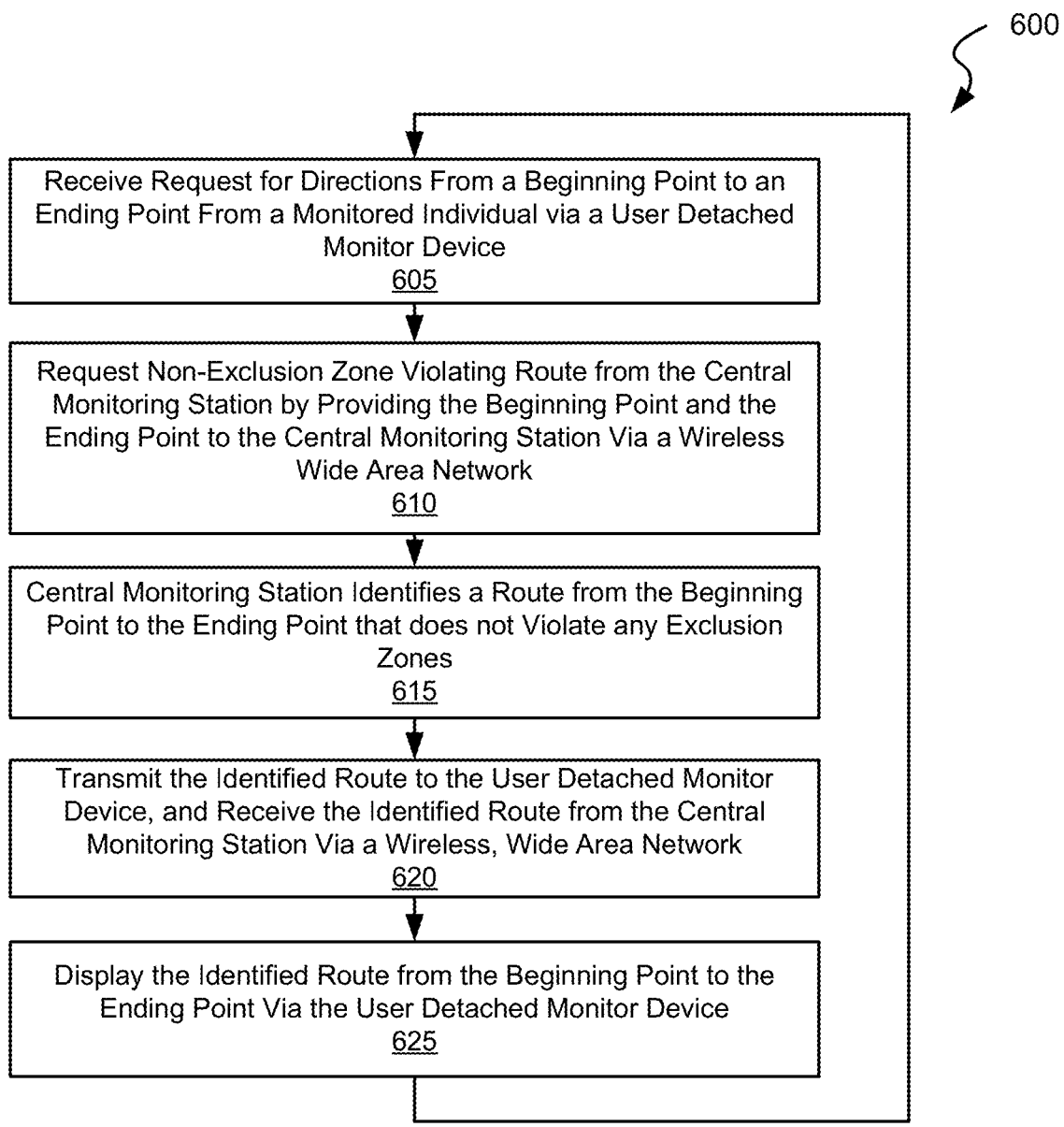
FIG. 6 is a flow diagram showing yet a further method in accordance with yet further embodiments for providing direction at a monitored individual that are consistent with monitoring system constraints.

Turning to FIG. 6, a flow diagram 600 shows yet a further method in accordance with yet further embodiments for providing direction at a monitored individual that are consistent with monitoring system constraints. Following flow diagram 600, a request is received via a user detached monitor device (block 605). The request is for directions and includes a beginning point and an ending or destination point from a monitored individual associated with the user detached monitor device. As one example, a monitored individual may intend to go to their place of work. In such a case, the monitored individual may indicate that the ending point is the location of the work. The beginning point may either be the location where the monitored individual is at that point which can in some cases be automatically generated using, for example, location detection circuit 126 discussed above in relation to FIG. 1b or may be a location provided to the user detached monitor device by the monitored individual using, for example, visual display and touch screen 116 discussed above in relation to FIG. 1b. Based upon the disclosure provided herein, one of ordinary skill in the art will recognize a variety of mechanisms and/or approaches that may be used to provide the aforementioned beginning point and ending point to the user detached monitor device.

The user detached monitor device communicates with a central monitoring station to request a non-exclusion zone violating route via a wireless wide area network (block 610). The central monitoring station receives the request and identifies a route from the beginning point o the ending point that does not violate any exclusion zones (block 615). One example of a route identification approach that may be used in relation to different embodiments is set forth below in relation to FIGS. 8a-8b. That said, any route identification approach may be used in relation to different embodiments that is capable of identifying a route between the beginning point and the ending point that does not traverse any exclusion zone.

Once the route is identified (block 615), the identified route is transmitted by the central monitoring station to the requesting user detached monitor device via the wireless wide area network and the user detached monitor device receives the identified route (block 620). The identified route may include, but is not limited to, a set of travel instructions in either a text or graphical form. Based upon the disclosure provided herein, one of ordinary skill in the art will recognize a variety of approaches and/or mechanisms that may used to provide the identified route to the user detached monitor device that may be used in relation to different embodiments. The identified route is then displayed by the user detached monitor device (block 625). Such display may, in some cases, require some formatting to render the identified route compatible with display elements of the user detached monitor device. As one example, such display may be done, for example, by graphically displaying the route on a map using visual display and touch screen 116. Alternatively, or in addition, displaying the route via the user detached monitor device may be done by displaying textual instructions defining the route via visual display and touch screen 116. Based upon the disclosure provided herein, one of ordinary skill in the art will recognize a variety of approaches for communicating the identified route to the monitored individual via the user detached monitor device.

Figure 7:
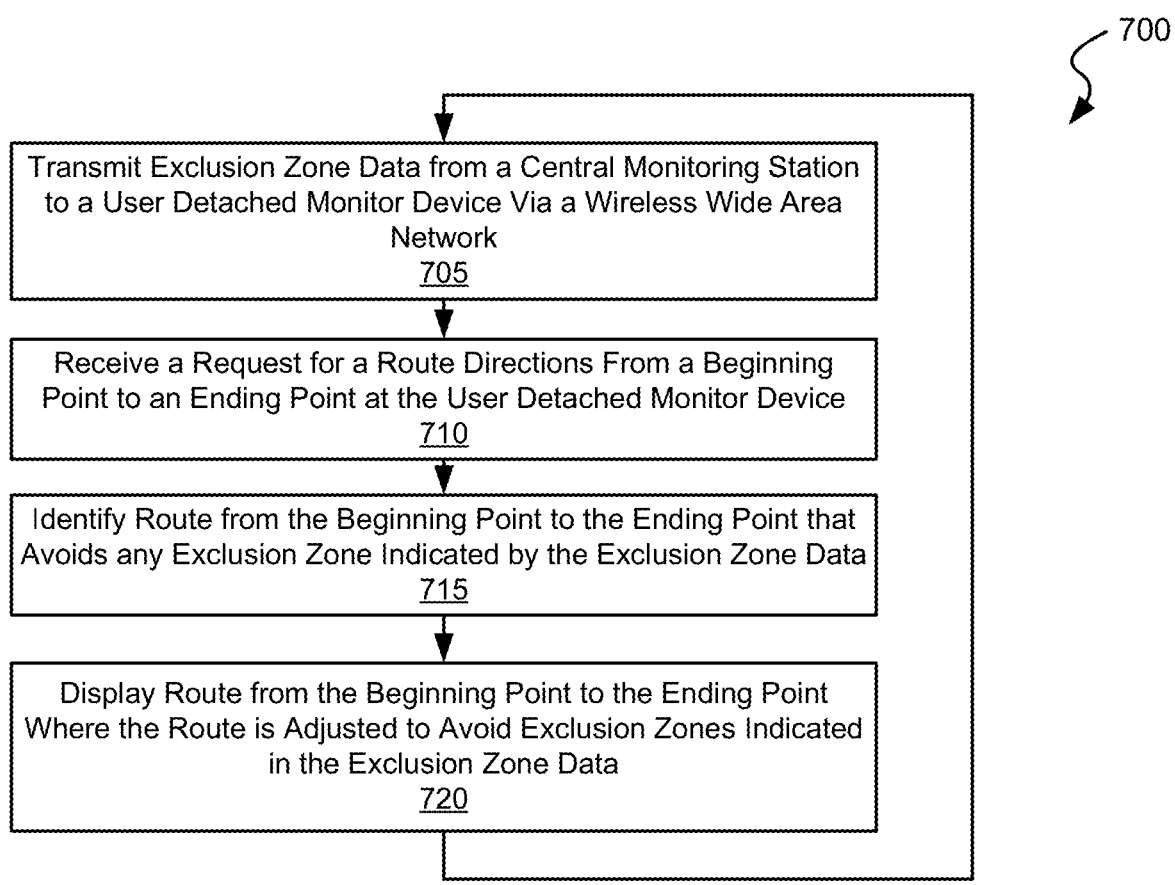
FIG. 7 is a flow diagram showing yet another method in accordance with yet further embodiments for providing direction at a monitored individual that are consistent with monitoring system constraints.

Turning to FIG. 7, a flow diagram 700 shows yet another method in accordance with yet further embodiments for providing direction at a monitored individual that are consistent with monitoring system constraints. Following flow diagram 700, exclusion zone data is transmitted from a central monitoring station to a user detached monitor device via a wireless wide area network without first requiring a route that did not violate an exclusion zone (block 705). A request is received via a user detached monitor device (block 710). The request is for directions and includes a beginning point and an ending or destination point from a monitored individual associated with the user detached monitor device. As one example, a monitored individual may intend to go to their place of work. In such a case, the monitored individual may indicate that the ending point is the location of the work. The beginning point may either be the location where the monitored individual is at that point which can in some cases be automatically generated using, for example, location detection circuit 126 discussed above in relation to FIG. 1b or may be a location provided to the user detached monitor device by the monitored individual using, for example, visual display and touch screen 116 discussed above in relation to FIG. 1b. Based upon the disclosure provided herein, one of ordinary skill in the art will recognize a variety of mechanisms and/or approaches that may be used to provide the aforementioned beginning point and ending point to the user detached monitor device.

Using the exclusion zone data previously received from the central monitoring station (block 705), the user detached monitor device identifies a route that extends from the beginning point to the ending point without extending into any exclusion zone between the beginning point and the ending point (block 715). One example of a route identification approach that may be used in relation to different embodiments is set forth below in relation to FIGS. 8a-8b. That said, any route identification approach may be used in relation to different embodiments that is capable of identifying a route between the beginning point and the ending point that does not traverse any exclusion zone.

Once the route is identified (block 715), the identified route is displayed by the user detached monitor device (block 720). This may be done, for example, by graphically displaying the route on a map using visual display and touch screen 116. Alternatively, or in addition, displaying the route via the user detached monitor device may be done by displaying textual instructions defining the route via visual display and touch screen 116. Based upon the disclosure provided herein, one of ordinary skill in the art will recognize a variety of approaches for communicating the identified route to the monitored individual via the user detached monitor device.

Figure 8A:
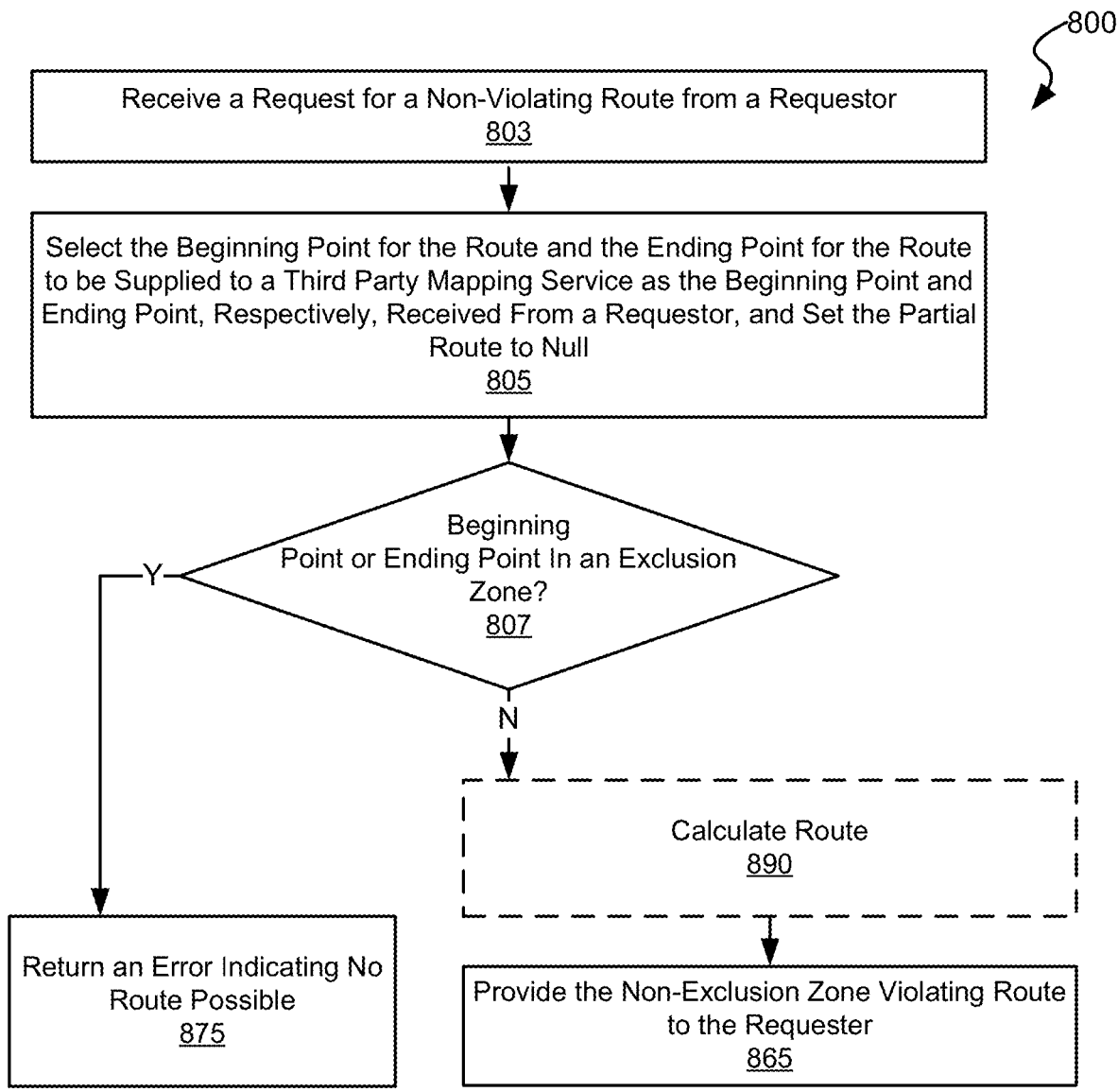
FIGS. 8a-8b show a flow diagram of an algorithm for plotting a course in accordance with some embodiments
Figure 8B:
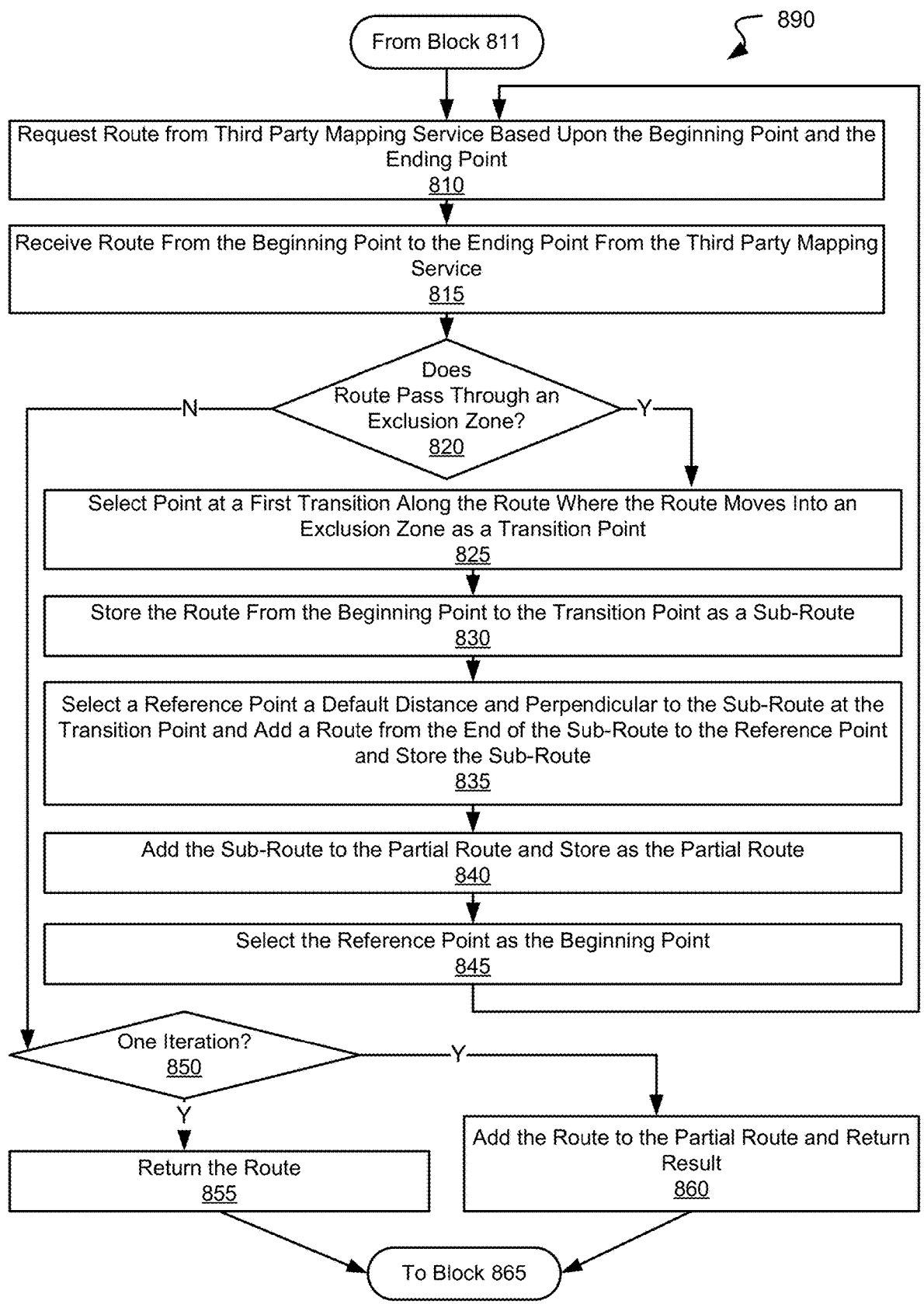

Turning to FIG. 8a and FIG. 8b, a flow diagram 800 shows an algorithm for plotting a course in accordance with some embodiments. Following flow diagram 800, a request for a non-violating route from a defined beginning point to a defined ending point is received from a requestor (block 803). Where, for example, a user detached monitor device has: the beginning point and ending point, access to a third-party mapping service, and exclusion zones for the monitored individual, the requestor and the recipient of the request that will perform the route identification may be modules on the same user detached monitor device. Alternatively, where a central monitoring station has: the beginning point and ending point, access to a third-party mapping service, and exclusion zones for the monitored individual, the requestor and the recipient of the request that will perform the route identification may be modules on the same central monitoring station. In some cases, the requestor may be user detached monitor device and the recipient may be a central monitoring station. Based upon the disclosure provided herein, one of ordinary skill in the art will recognize a variety of requestors and recipients, and combinations thereof that may be used in relation to different embodiments.

The beginning point for the route and the ending point for the route that are to be supplied to a third-party mapping service are respectively selected to be those received from the requestor (block 805). In addition, a partial route is set equal to null. It is determined whether either the beginning point or the ending point are within an exclusion zone (block 807). This is done by comparing the location of the beginning point with regions identified as exclusion zones, and similarly by comparing the location of the ending point with regions identified as exclusion zones. Where either one of the beginning point of the ending point are located in an exclusion zone (block 807), an error is returned to the requestor indicating that a route which does not violate an exclusion zone is not possible (block 875).

Alternatively, where neither the beginning point nor the ending point are within an exclusion zone (block 807), a route is calculated between the beginning point and the ending point that does not traverse an exclusion zone (block 890). Block 890 is shown in dashed lines as it is shown in more detail in FIG. 8*b*. Turning to FIG. 8*b*, a route is requested from the third-party mapping service (block 810). This includes accessing the third-party mapping service via an Internet or other communication link, and requesting a route from the beginning point to the ending point. This may be done by the recipient device that is responsible for identifying a non-violating route. Thus, in some instances this request to the third-party mapping service may be made by a central monitoring station. In other instances, the request to the third-party mapping service may be made by a user detached monitor device. Based upon the disclosure provided herein, one of ordinary skill in the art will recognize a variety of third-party mapping services that may be accessed. Further, based upon the disclosure provided herein, one of ordinary skill in the art will recognize a variety of devices that may initiate access to the third-party mapping service.

A route from the beginning point to the ending point is received from the third-party mapping service (block 815). It is determined whether the received route traverses any exclusion zone associated with the monitored individual (block 820). This may be done, for example, by sequentially comparing individual locations along the received route and exclusion zone regions to determine if any of the individual locations along the received route are within an exclusion zone. As part of determining whether the received route traverses any exclusion zone, a transition is identified where the route first crosses into an exclusion zone. If the route does not cross into any exclusion zones, there will not be a transition.

Where the route does traverse an exclusion zone (block 820), a point at a first transition along the route where the route first contacts an exclusion zone is selected as a transition point (block 825). As mentioned above, this transition point may be identified as part of determining whether the route traverses an exclusion zone. The route from the beginning point to first transition point is stored as a sub-route (block 830), and a reference point both a default distance from the transition point and perpendicular from the transition point is selected that is not itself within an exclusion zone (block 835). Additionally, the relatively short route from the end of the sub-route to the reference point is added to the sub-route to yield a route from the beginning point to the reference point, and the result is stored as the sub-route. The sub route is then added to the partial route and stored as the partial route (block 840). This results in a partial route which is a route from the original beginning point provided in the original request of block 803. Where this is the first iteration, the beginning point in the sub-route is the same as the original beginning point. Next, the reference point is selected as the beginning point (block 845), and the process of determining a route (blocks 810-845) begins again with the new beginning point and the original ending point.

Where the route does not traverse any exclusion zone (block 820), it is determined whether the request sent to the third-party mapping service was an initial request for routing (i.e., only a single iteration was needed to define the route) (block 850). Where it was an initial request (block 850) as in the case where an initial request for a route from the beginning point to the ending point returned a route that does not traverse any exclusion zone, the route returned for the third-party mapping service is returned unmodified to block 865 (block 855). Alternatively, where more than one request to the third-party mapping service was involved (block 850), the route returned from the third-party mapping service is added to the partial route and the sum of the two is returned to block 865 (block 860).

Returning to FIG. 8*a*, the received route from block 890 is provided as a non-exclusion zone violating route to the requestor (block 865). Thus, where the requestor is one module in a user detached monitor device and another module in the user detached monitor device determined the route, the route received from block 890 is returned to the module that requested the route within the user detached monitor device. Alternatively, where the requestor is a user detached monitor device and a central monitoring station determined the route, the route received from block 890 is returned to the user detached monitor device. As yet another alternative, where the requestor is one module in a central monitoring station and another module in the central monitoring station determined the route, the route received from block 890 is returned to the module that requested the route within the central monitoring station. Based upon the disclosure provided herein, one of ordinary skill in the art will recognize a variety of devices and/or modules to which the route may be returned in accordance with different embodiments, and/or a variety of devices and/or modules that may determine the route.

In conclusion, the present invention provides for novel systems, devices, and methods for monitoring individuals and/or assets. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A monitoring system, the monitoring system comprising:
   a user attached monitor device including:
      a securing element operable to secure the user attached monitor device to a limb of the monitored individual;
      a second local communication circuit operable to support communication via a local communication link;
      a second computer readable medium including exclusion zone data; and
   a user detached monitor device including:
      a display;

a local communication circuit operable to support communication via the local communication link with the user attached monitor device;

a processor;

a first computer readable medium including instructions executable by the processor to:

receive a request for routing between a beginning point and an ending point;

receive the exclusion zone data for the monitored individual from the user attached monitor device via the local communication link;

using the exclusion zone data, identify a route from the beginning point to the ending point that does not violate an exclusion zone; and display the identified route from the beginning point to the ending point that does not violate the exclusion zone.

2. The monitoring system of claim 1, wherein the display is selected from a group consisting of: a graphical display, an audio display, and a combination of an audio display and a graphical display.

3. The monitoring system of claim 1, wherein the processor is a first processor, wherein the user attached monitor device includes a second processor, and wherein the second computer readable medium further includes instructions executable by the second processor to request at least at least one exclusion zone data from a central monitoring station via a wireless wide area network.

4. The monitoring system of claim 1, wherein the request for the exclusion zone data indicates an area of interest between the beginning point and the ending point.

5. The monitoring system of claim 1, wherein the processor is a first processor, and wherein the user attached monitor device further includes:

a second processor; and wherein the second computer readable medium further includes instructions executable by the second processor are further executable to:

request the exclusion zone data from a central monitoring station via a wireless wide area network.

6. The monitoring system of claim 5, the system further comprising:

the central monitoring station including a third computer readable medium including at least one exclusion zone data.

7. The monitoring system of claim 6, wherein the request for the exclusion zone data indicates an area of interest between the beginning point and the ending point.

8. The monitoring system of claim 1, wherein identifying the route from the beginning point to the ending point that does not violate an exclusion zone includes requesting the route from a central monitoring station and receiving the route from the central monitoring station via a wireless wide area network.

9. The monitoring system of claim 8, wherein identifying the route from the beginning point to the ending point that does not violate an exclusion zone includes repeatedly accessing a third-party mapping service Internet site.

10. The monitoring system of claim 1, wherein identifying the route from the beginning point to the ending point that does not violate an exclusion zone includes repeatedly accessing a third-party mapping service Internet site.

11. A monitoring system, the monitoring system comprising:

a user detached monitor device including:

a display;

a first local communication circuit operable to support communication via a local communication link with a user attached monitor device;

a processor;

a first computer readable medium including instructions executable by the processor to:

receive a request for routing between a beginning point and an ending point;

receive exclusion zone data for the monitored individual;

using the exclusion zone data, identify a route from the beginning point to the ending point that does not violate an exclusion zone; and display the identified route from the beginning point to the ending point that does not violate the exclusion zone;

the user attached monitor device including:

a securing element operable to secure the user attached monitor device to a limb of the monitored individual;

a second local communication circuit operable to support communication via the local communication link;

a second computer readable medium including at least one exclusion zone data; and a central monitoring station including a third computer readable medium including at least one exclusion zone data.

12. The monitoring system of claim 11, wherein the display is selected from a group consisting of: a graphical display, an audio display, and a combination of an audio display and a graphical display.

13. A method for aiding a monitored individual, the method comprising:

receiving a request for routing between a beginning point and an ending point, wherein the request is received via a user detached monitor device;

receiving exclusion zone data for the monitored individual from a user attached monitor device via a local communication link, wherein the user attached monitor device is secured to a limb of the monitored individual by a securing element;

using the exclusion zone data, identifying a route from the beginning point to the ending point that does not violate an exclusion zone; and displaying the identified route from the beginning point to the ending point that does not violate the exclusion zone via a display one the user detached monitor device.

14. The method of claim 13, the method further comprising:

requesting the exclusion zone data from the user attached monitor device via the local communication link between the user detached monitor device and the user attached monitor device.

15. The method of claim 13, the method further comprising:

requesting at least at least one exclusion zone data from a central monitoring station via a wireless wide area network.

16. The method of claim 13, wherein the request for the exclusion zone data indicates an area of interest between the beginning point and the ending point.

17. The method of claim 13, wherein identifying the route from the beginning point to the ending point that does not violate an exclusion zone includes requesting the route from a central monitoring station and receiving the route from the central monitoring station via a wireless wide area network.

18. The method of claim 17, wherein identifying the route from the beginning point to the ending point that does not violate an exclusion zone includes repeatedly accessing a third-party mapping service Internet site.

19. The method of claim 13, wherein identifying the route from the beginning point to the ending point that does not violate an exclusion zone includes repeatedly accessing a third-party mapping service Internet site.

20. The method of claim 13, wherein the display is selected from a group consisting of: a graphical display, an audio display, and a combination of an audio display and a graphical display.

* * * * *